Patented Feb. 27, 1940

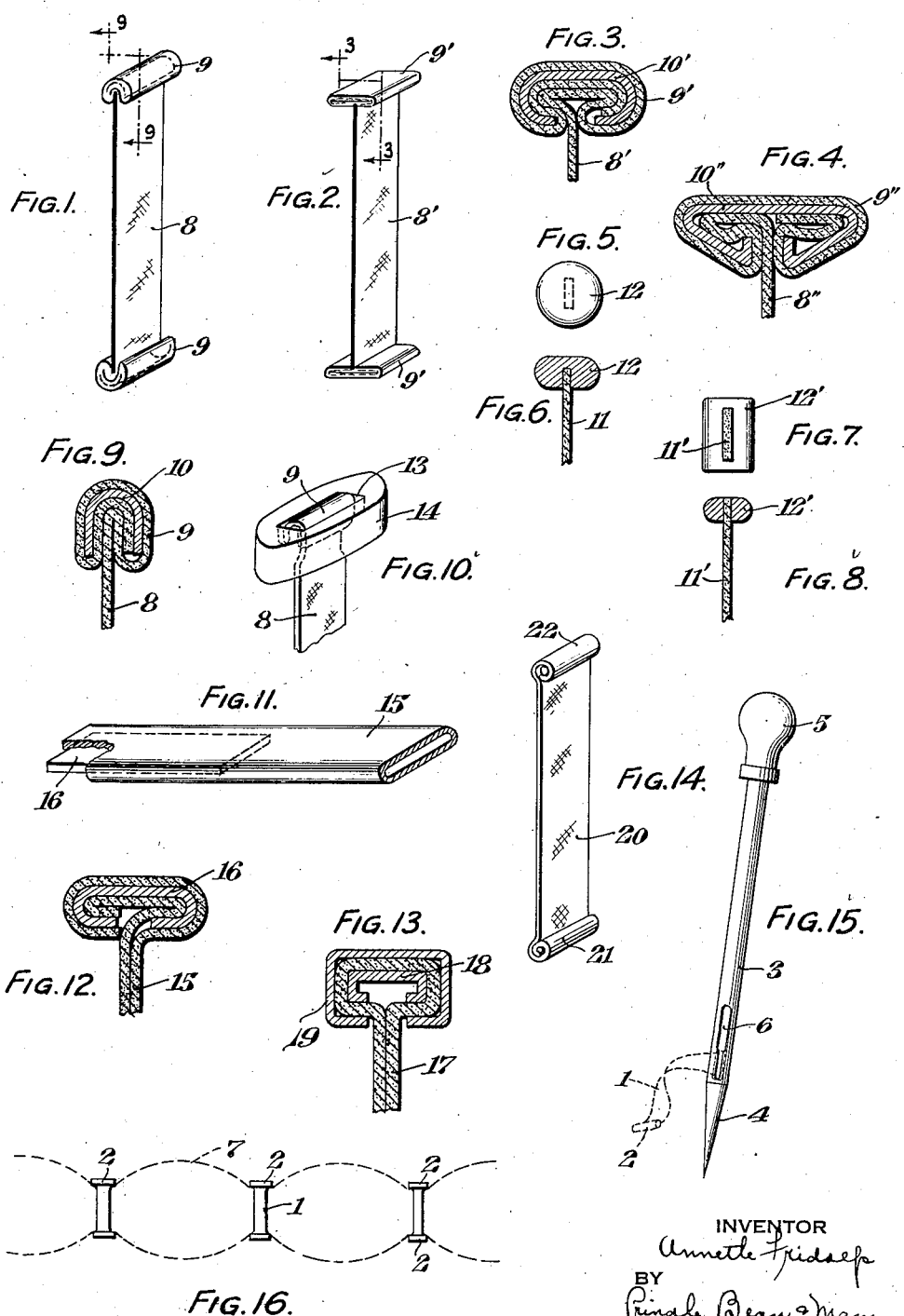

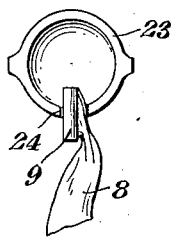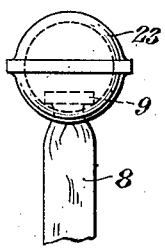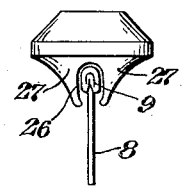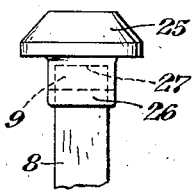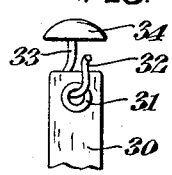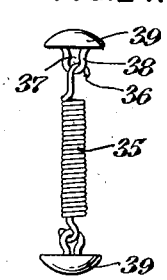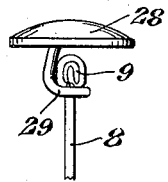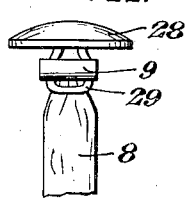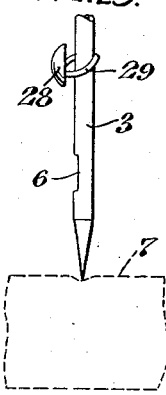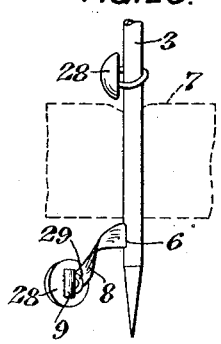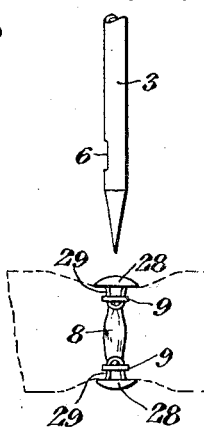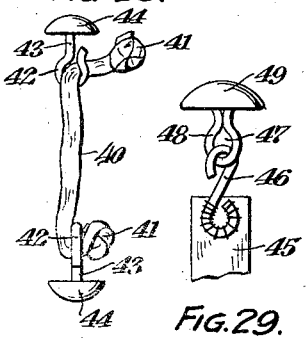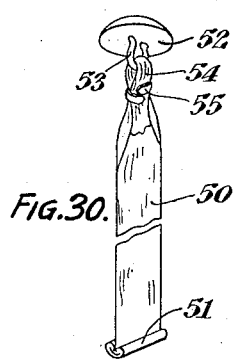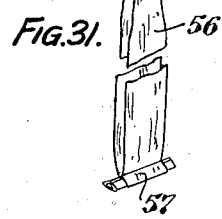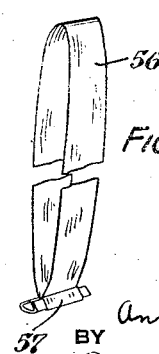

2,192,161

UNITED STATES PATENT OFFICE 2,192,161

CONNECTING MEANS TO BE USED FOR TUFTING MATTRESSES AND SIMILAR OPERATIONS

Annette Fridolph, New York, N. Y., assignor to A. B. A. Specialties Company, Inc., New York, N. Y., a corporation of New York Application October 23, 1936, Serial No. 107,122

11 Claims. (Cl. 5—356)

This invention relates to improvements in connecting or fastening elements which may be used for tufting mattresses, upholstery and the like. In their use for tufting, this operation may be accomplished quickly, cheaply and expeditiously and the articles used are securely fastened in proper position to give the proper tufting effect and appearance.

A further object is the provision of a tufting element which may be applied in one simple operation. Another object is the provision of a fastening or attaching element to be used in place of a button or other fastening element, which may be used with a button, ornamental head or similar articles, if desired.

This application is in part a division of my co-pending application Ser. No. 542,799 filed June 8, 1931, on Method of tufting and articles therefor.

To the accomplishment of the foregoing and such other objects as may hereinafter appear, this invention consists in the construction, combination and arrangements of parts hereinafter described and then sought to be defined in the appended claims, reference being had to the accompanying drawings forming a part hereof and which show, merely for the purposes of illustrative disclosure, several embodiments of my invention, it being expressly understood, however, that various changes may be made in practice within the scope of the claims without digressing from my inventive idea.

In the drawings—

Figure 1 represents a perspective view of one form of tufting element.

Figure 2 represents a perspective view of another form of tufting element.

Figure 3 is a vertical transverse cross section taken along line 3—3 of Figure 2.

Figure 4 is a similar cross section showing a slightly modified form.

Figures 5 and 6 are detailed views showing a modified form of tufting button attached to the tufting element.

Figures 7 and 8 are detailed views showing another modified form of tufting button attached to the tufting element.

Figure 9 is a vertical cross section taken substantially on line 9—9 of Figure 1.

Figure 10 is a perspective view of another form of tufting button.

Figure 11 illustrates in perspective the initial steps in the method of forming another form of tufting element.

Figure 12 is a vertical cross section through the tufting element and article formed from the parts shown in Figure 11.

Figure 13 is a similar cross section of a modified construction.

Figure 14 is a perspective view of another modification of tufting element.

Figure 15 is a perspective view of one form of tufting needle or device used to apply tufting articles coming within this invention.

Figure 16 is a diagrammatic view of an article such as a mattress, which has been tufted by the use of the tufting element disclosed herein.

Figure 17 is a vertical cross section of a globular form of tufting button showing the tufting element in the process of being inserted therein.

Figure 18 is a side elevation of the completed tufting article and element shown in Figure 17.

Figure 19 is a side elevation of the tufting article with another form of button secured thereto.

Figure 20 is an elevation at right angles to the view shown in Figure 19.

Figures 21 and 22 are views similar to Figures 19 and 20 of another modification.

Figures 23 and 24 are side elevations of other forms of tufting elements with other forms of tufting buttons or articles secured thereto.

Figures 25, 26 and 27 are diagrammatic views illustrating the use of tufting articles and buttons such as shown in Figures 21 and 22.

Figures 28 and 29 are views in elevation of additional modifications of tufting elements and tufting buttons.

Figures 30, 31 and 32 are perspective views of different embodiments of my invention in connecting and tufting elements.

It has long been standard practice in tufting mattresses, upholstery and the like, to use a loop or tape or twine and secure buttons, clasps, pieces of leather and other articles to these loops to prevent the cutting or tearing of the fabric and to give a finished and ornamental appearance to the tufting element. The operation of tufting and applying these ornamental articles to the tufting elements has been slow and tedious and laborious, and has always added materially to the expense of tufting mattresses, upholstery and the like.

It is the purpose of this invention to provide new forms of tufting assemblies which may be used in accordance with my new method disclosed in my co-pending application, whereby the tufting operation is simplified and cheapened. The result is a much stronger product having long life and wear and which may be varied by the addition of buttons and the like for purposes of ornamentation and appearance in many ways.

The general method of tufting which I have disclosed in my co-pending application comprises the use of a tufting assembly including a tufting element which is designated generally by the reference character 1, and which has secured or provided on each end thereof the tufting head 2, see Figure 16 of the drawings. The structure of this tufting element 1 and the tufting heads 2 and various modifications thereof will be described later. In Figure 15, I show a needle or tufting device 3 for applying the tufting element in proper position and for accomplishing the tufting operation. This needle is elongated and provided with the sharp point 4, the head or handle 5 and the elongated slot or recess 6 in its lower portion. The tufting heads 2 are preferably formed transversely of the ends of the element 1, and the tufting element 1 is restricted in cross section with respect to the width of the tufting head and may be in the form of a twine, tape or even metallic member.

In the practice of my method disclosed in my co-pending application, the tufting needle 3 is driven entirely through the article being tufted, and the tufting element 1 placed in the position indicated in dotted lines in Figure 15. The tufting needle is then withdrawn from the article being tufted and the lowermost tufting article or head 2 will engage the underside of the mattress or other article 7 being tufted and when the upper tufting article or head 2 is released it will engage the upper surface of the mattress. Sufficient pressure and tension are used in operation to give the desired tufting appearance as indicated diagrammatically in Figure 16. It is seen by the practice of this method, the application of each tufting element is a simple, single operation and may be accomplished quickly and expeditiously in a minimum amount of time by unskilled labor, and with absolute security.

This method may be utilized with various forms of tufting assemblies according to the present invention, and attention will first be directed to Figure 1, in which the tufting element is preferably in the form of a tape 8 having the tufting articles or heads 9 at each end. These heads are preferably formed by means of a stiff channeled member 10 which may be made of metal or other suitable material, and in which and around which is clamped and folded the end portion of the tape 8, see Figure 9 particularly. In this form, the tufting head is completely covered by the fabric of the tufting element and the channel shaped stiff member 10 is permanently and securely fastened to the tape so that the tufting element and its tufting heads form an integral structure.

The construction shown in Figure 2 is quite similar to that of Figure 1 with the exception that the tufting head 9' is flattened, the cross section of Figure 3 showing the arrangement of the stiff element 10' and the folded and infolded portions of the tufting element 8'.

Figure 4 illustrates an additional variation in which the tufting element 8'' is similar and in which the tufting head 9'' is similar, differing only in the shape of the stiffened member 10'' which gives the tufting head a somewhat different appearance.

In the form shown in Figures 5, 6, 7, and 8, the tufting element is designated generally by the reference character 11, and to the end thereof is secured a suitable head 12. In the form shown in Figures 5 and 6 the end of the tufting element 11 is inserted within and secured entirely within the head 12, whereas in the structure shown in Figures 7 and 8 the end of the tufting element 11' extends through the head 12'. These heads may be round, rectangular, or in fact of various shapes, and may be molded or cast upon the tufting elements 11 or 11' and suitably ornamented, if desired.

In the form shown in Figure 10, the tufting element is preferably constructed substantially as shown in Figure 1 having the tape or fabric body 8 and the stiffened head 9. This head 9 fits in a suitable recess or opening 13 formed in a button member 14, the tape 8 passing entirely therethrough in a restricted opening or slot whereby the head 9 engages the shoulders formed by the restricted opening or slot entering into the recess 13. This structure, of course, provides for considerable variety from the standpoint of ornamentation and decoration, and has the advantage of ready detachability.

In the forms shown in Figures 11 and 12, the structure is quite similar to that shown in Figures 1, 2 and 3, the most important difference being that the tufting element 15 is formed of a tube of suitable fabric and into one end of which a piece of metal or other suitable material 16 is inserted and then bent into the form shown in Figure 12 so that the fabric is infolded within and covers the bent metallic member 16. This forms an integral tight connection which is very strong and of long life, the parts being folded and clamped together.

In the form shown in Figure 13, the tufting element 17 is tubular or two-ply and has the interior stiffening element 18 and the exterior stiffening element 19 which are bent or clamped, as shown, to provide a tufting article or head having an exterior metal surface which may be ornamented and decorated as desired. The interior and exterior stiffening elements may be provided or formed by using a tubular shaped metal member through which the fabric element 17 may be passed or threaded before the metal member is bent or clamped thereon. Furthermore, the interior stiffening element 18 may be omitted and the exterior element 19 used alone by clamping the same around its respective end of the tufting element 17.

In Figure 14 is shown a further modification in which the fabric tufting element 20 is folded or coiled at its ends, to form heads 21, which may be dipped into a suitable liquid or other compound such as liquid cement, which, when it hardens provides the stiffened tufting article or head 22 at each end.

In Figures 17 and 18, I show a tufting or fastening element, substantially as shown in Figures 1 and 9, that is, it has the tape or other fabric member 8 and the stiffened head 9. A suitable ornamental button 23 is provided with a slot or opening 24 through which the stiffened head 9 is inserted. This opening is less in diameter than the length of the stiffened head 9, and consequently the latter is securely locked therein when positioned in its normal crosswise position shown in dotted lines in Figure 18.

In Figures 19 and 20, the same structure of tufting or fastening element is utilized, as described in connection with Figures 17 and 18. In this connection the ornamental button 25 is provided with a groove or socket 26 in its underside into which the stiffened head 9 of the tufting element 8 slidably fits. It is to be understood that the material of the lower portion of this button 25 may be bendable so that the depending flange portions 27 may be bent to frictionally engage the stiffened head 9 and securely hold the button in position.

In Figures 21 and 22, a similar tufting or fastening element is used in connection with an ornamental button 28 which is provided with a loop of wire or other suitable material 29 less in width than the length of the stiffened head member 9 so that the latter may be inserted therein and securely held when in crosswise position as clearly shown in Figure 22.

In Figure 23, the tufting element 30 is provided with an eyelet 31 near its end which is adapted to receive the hook 32 formed in the metal member 33 depending from the ornamental button 34. In Figure 24, the tufting element 35 is formed of a coil or spiral spring having a hook 36 at one or both ends adapted to pass through the eye 37 provided by the loop 38 of wire or other suitable material depending from the ornamental button 39.

In Figure 28, the tufting element 40 is in the form of a suitable flexible material having a knot or enlarged knob 41 formed or provided at one or both ends to prevent the withdrawal of the tufting element 40 from the eye or eyes 42 provided by the loop or loops or hooks 43 of wire or other suitable material depending from the ornamental buttons 44. In Figure 29 the tufting element 45 has a hook member 46 secured to one or both ends which is adapted to pass through the eye 47 formed by the loop 48 of metal or other suitable material depending from button 49.

Figures 25, 26 and 27 illustrate my method in connection with the structure shown in Figures 21 and 22. The top button 28 is first placed upon the shank of the needle 3 and then the needle passed through the mattress 7 until slot or recess 6 is exposed beyond the under surface thereof. Then one of the stiff tufting heads 9 of the tufting element 8 is placed within the slot or recess 6 of the needle and the other stiff tufting head 9 is passed through the loop 29 of the second button 28. The tufting needle is then withdrawn through the mattress 7 until the slot or recess is exposed beyond the upper surface thereof and the first mentioned tufting head 9 passes through the loop 29 of the first mentioned button 28, when it is released and the parts assume the position shown in Figure 27. This merely shows the use of ornamental buttons in connection with the practice of my method.

In Figure 30 the tufting element is composed of an elongated body 50 of tape or other suitable flexible or resilient material having one end provided with a stiffened head 51 which may be similar in construction to the head shown in numerous of the previous figures of the drawings, such as 1, 2, 3, 4, 9, 12, 13, 14 and others. To the other end of the body a button or similar member 52 having the depending loop or hook 53 is connected by means of looping the free end of the body member 50, as at 54, and connecting the two parts of the body member to close the loop by means of a rivet, clamp, or other holding member 55.

In the form shown in Figure 31 the body 56 of the device is in the form of a suitable double length of material having the connecting or tufting head 57 secured to one end and having the ornamental button head or the like 58 secured to the other end. The member 58 is provided with a depending loop 59 through which the closed loop end 60 of the body 56 is looped or tied.

Figure 32 is a view of the same main element as shown in Figure 31 without the button or other head secured to the end thereof. It is of course adapted to be used with either the button head or some of the well-known forms of fastening or attaching elements in general use.

I have referred to the stiffened head in its various forms as a tufting or fastening element or article complete in itself, and it is to be understood that it may serve generally as a means for effectively and conveniently holding a button or other ornamental member.

It is to be noted that the disclosure of this invention includes the provision of a tufting element having a definite preformed length which has many advantages for use in tufting operations, and of course the invention may be utilized in the form of a partially complete tufting element, that is where the head or connecting member is at one end only instead of on both ends.

It is to be expressly understood, that, while I have shown and described a number of uses, constructions, modifications and varieties of these articles of manufacture, there are many other constructions and uses which come within my broad invention and can be used in the practice of my method.

What I claim is:

1. A completely preformed tufting assembly for tufting mattresses, upholstery and the like, which comprises an elongated tufting element or body with a substantial stiff tufting head permanently secured on each end thereof.

2. A completely preformed tufting assembly for tufting mattresses, upholstery and the like, comprising an elongated tufting element or body having a substantial stiff tufting head permanently provided on the end thereof, and an ornamental fastening element such as a button or the like provided with means for receiving said tufting head so that said element may be held by its engagement with said tufting head against the face of the article being tufted.

3. As an article of manufacture, a tufting assembly for tufting mattresses, upholstery and the like, including an elongated tufting element or body having a substantial stiff head on each end thereof and adapted to pass through the body being tufted, each head including a stiff bendable member to which the end part of said body is clamped and within which part of the body is folded.

4. As an article of manufacture, a tufting element for tufting mattresses, upholstery and the like, including an elongated tufting element or body having a substantial stiff head on each end thereof and adapted to pass through the body being tufted, each head including a stiff bendable member to which the end part of said body is clamped and within which part of the body is folded, said stiff bendable member being flattened so as to form a flattened channel and provide a head of relative substantial area.

5. As an article of manufacture, a tufting assembly for tufting mattresses, upholstery and the like, which includes an elongated flexible tufting element or body having a substantial stiff tufting head permanently secured to one end of said body, each stiff tufting head including a bendable element within which part of the body is clamped and folded whereby a permanent connection is provided between the body and said tufting head.

6. A preformed connecting or tufting assembly which comprises an elongated body of definite length formed of flexible material and having a tufting head permanently secured to each end thereof, one, at least, of said tufting heads being of a nature to be threaded through a body to be tufted.

7. A preformed connecting or tufting assembly which comprises a tufting element or body in the form of a loop of flexible material, said body having a substantial stiff tufting head permanently secured to one end thereof, of a nature to be threaded through a body to be tufted, and another tufting head permanently secured to the other end of said body.

8. As an article of manufacture, a complete preformed unitary tufting assembly consisting of two tufting heads permanently connected together by an elongated flexible tufting element or body, said heads when in normal position being too large in size to pass through the hole in the article being tufted which is occupied by said tufting element or body, one of said tufting heads when in an abnormal position being adapted to be passed through the article being tufted and said hole with said tufting element or body and then to assume its normal position transverse to said hole.

9. The combination with a mattress or similar article of upholstering, of tufting assemblies therethrough, each of a preformed unitary character including an elongated flexible tufting element of a definite preformed length, having substantially stiff tufting heads permanently in connection therewith at its opposite ends.

10. The combination of an article of upholstering such as a mattress, and tufting assemblies therethrough, each assembly being completely preformed and unitary in character, including an elongated flexible tufting element of a definite length passing through the article and having at its opposite ends permanently connected substantially rigid tufting heads engaging opposite faces of the article of upholstery.

11. A tufted article of upholstering such as a mattress comprising a filled casing having a tufting assembly in connection therewith and of a preformed unitary nature including an elongated flexible tufting element of definite preformed length passing through said filled casing, and tufting heads permanently in connection with the ends of said tufting element and disposed at the opposite faces of the casing.

ANNETTE FRIDOLPH.